(12) United States Patent
Yamawaki et al.

(10) Patent No.: US 6,475,673 B1
(45) Date of Patent: Nov. 5, 2002

(54) PROCESS FOR PRODUCING LITHIUM TITANATE AND LITHIUM ION BATTERY AND NEGATIVE ELECTRODE THEREIN

(75) Inventors: Tetsuya Yamawaki, Chigasaki (JP); Kiyoshi Eto, Chigasaki (JP); Hideki Sakai, Chigasaki (JP)

(73) Assignee: Toho Titanium Co., Ltd., Chigasaki (JP)

( * ) Notice: Subject to any disclaimer, the term of this patent is extended or adjusted under 35 U.S.C. 154(b) by 0 days.

(21) Appl. No.: 09/501,662

(22) Filed: Feb. 10, 2000

(30) Foreign Application Priority Data

Feb. 16, 1999 (JP) .......................................... 11-037275
Jan. 26, 2000 (JP) ........................................ 2000-017090

(51) Int. Cl.[7] ........................ C01G 23/00; H01M 4/58
(52) U.S. Cl. .................................... 429/231.5; 423/598
(58) Field of Search ........................... 429/218.1, 231.5, 429/231.95; 423/598

(56) References Cited

U.S. PATENT DOCUMENTS 5,312,582 A * 5/1994 Donado ........................ 419/19
6,120,938 A * 9/2000 Atsumi et al. ........... 429/231.1
6,139,815 A * 10/2000 Atsumi et al. .............. 423/598

FOREIGN PATENT DOCUMENTS

JP  A-9-30972    2/1997
JP  WO99/03784  * 1/1999  ............ H01M/4/58

OTHER PUBLICATIONS

D. C. Johnson, Superconducting and Normal State Properties of $Li_{1+x}Ti_{2-x}O_4$ Spinel Compounds. I. Preparation, Crystallography, Superconduting Properties, Electrical Resistivity, Dielectric Behavior, and Magnetic Susceptibility, Journal of Low Temperature Physics, vol. 25, No. ½, 1976.

* cited by examiner

Primary Examiner—Wayne A. Langel
Assistant Examiner—Jonas Strickland
(74) Attorney, Agent, or Firm—Oliff & Berridge, PLC

(57) ABSTRACT

In a process for producing lithium titanate, a mixture of titanium dioxide and at least one lithium compound selected from the group consisting of lithium carbonate, lithium hydroxide, lithium nitrate, and lithium oxide is presintered at a temperature of 670° C. or more and less than 800° C. to yield a composition consisting of $TiO_2$ and $Li_2TiO_3$ or a composition consisting of $TiO_2$, $Li_2TiO_3$ and $Li_4Ti_5O_{12}$. The composition is then sintered at a temperature in the range of 800 to 950° C.

6 Claims, No Drawings

PROCESS FOR PRODUCING LITHIUM TITANATE AND LITHIUM ION BATTERY AND NEGATIVE ELECTRODE THEREIN

BACKGROUND OF THE INVENTION

1. Technical Field

The present invention relates to a process for producing lithium titanate which is suitable for electrodes for lithium ion batteries used, for example, as backup power supplies for personal computers and for portable types of equipment and the like, and to lithium ion batteries using the same.

2. Background Art

The recent rapid development of technology in the field of electronics has allowed compact design and weight reduction in electronic equipment. Secondary batteries as driving or backup power supplies for these equipment are strongly required to be of compact design and light weight, and to have high energy density. Recently, development of larger electricity storage systems are also urgently required for electric automobiles and off-peak domestic electricity storage systems in order to reduce $CO_2$ emissions. As new types of secondary batteries which can meet these requirements, secondary lithium batteries which have high energy density to volume have attracted attention.

Lithium titanate, presented by the formula, $Li_4Ti_5O_{12}$ (termed $Li_{4/3}Ti_{5/3}O_4$ bellow), is used as a material for secondary lithium batteries. As processes for production of these compounds, wet methods and dry methods are known (for example, Japanese Patent Application, First Publication, No. 309727/97, and Journal of Low Temperature Physics, Vol. 25, p. 145, 1976). Although wet methods can produce lithium titanate having good crystallinity, these methods require complicated processes, waste water treatment and the like, which poses problems of economic efficiency. To contrast, although the conventional dry methods are simple in process, lithium titanate by-products with formulas other than the above are produced. Furthermore, control of the atomic ratio of titanium and lithium (hereinafter referred to as the Li/Ti ratio) is difficult due to vaporization loss of elemental lithium and lithium compounds, and titanium dioxide as a raw material remains in the products. As a result, the method poses problem in that lithium titanate, $Li_4Ti_5O_{12}$, cannot be efficiently produced.

SUMMARY OF THE INVENTION

The present invention was made to solve the above-mentioned problems. Objects of the invention follow. The lithium titanate in the invention refers to compounds represented by the formula $Li_4Ti_5O_{12}$, which refers to the "desired compound" in one case.

(1) Providing a production process for efficiently producing lithium titanate using a dry method.
(2) Providing a process for producing lithium titanate, in which vaporization loss of lithium compounds in the sintering reaction can be suppressed, so that the Li/Ti ratio can be freely controlled in the range of 0.78 to 0.82(i.e., around 0.80), and preferably in the range of 0.79 to 0.80.
(3) Providing a process for producing lithium titanate, in which persistence of titanium dioxide as a raw material can be suppressed.

According to research by the inventors, it was discovered that vaporization loss of lithium compounds can be extremely decreased, the Li/Ti ratio can be easily controlled, titanium dioxide as a raw material did not remain, and therefore lithium titanate compounds can be efficiently produced by employing a process in which specific sintering conditions are combined.

The invention was completed based on the above research. The invention provides a process for producing lithium titanate by presintering a mixture of titanium dioxide and at least one lithium compound selected from the group consisting of lithium carbonate, lithium hydroxide, lithium nitrate, and lithium oxide, yielding at least one of a composition comprising $TiO_2$ and $Li_2TiO_3$ and a composition comprising $TiO_2$, $Li_2TiO_3$ and $Li_4Ti_5O_{12}$, and sintering the composition.

The method according to the invention will be explained in detail hereinafter.

DETAILED DESCRIPTION OF THE INVENTION

The lithium titanate produced by the invention is represented by the general formula $Li_XTi_YO_{12}$, in which the Li/Ti ratio is in the range of 0.78 to 0.82, X is in the range of 3 to 5, and Y is in the range of 4 to 6. In particular, the invention is directed to mono-phasic lithium titanate with a spinel crystal structure presented by $Li_4Ti_5O_{12}$, or a mixture or mixed crystal structure of $Li_4Ti_5O_{12}$, $Li_2TiO_3$, and $TiO_2$.

1. Raw Materials

The lithium compounds as raw materials for in the invention are one or more lithium compounds selected from the group consisting of lithium carbonate, lithium hydroxide, lithium nitrate, and lithium oxide. Among these compounds, lithium carbonate and lithium hydroxide are preferably used. These lithium compounds used for as materials preferably have high purity, normally of 99.0 weight % or more. For example, when lithium hydroxide is used as a raw material, $Li_2CO_3$ is preferably included at 99.0 weight % or more, and is more preferably 99.5 weigh % or more; the content of Na, Ca, and Mg, etc., as impurities, is preferably 100 ppm or less, and is more preferably 10 ppm or less; and the content of Cl and $SO_4$ is preferably 100 ppm or less, and is more preferably 50 ppm or less. The water component should be sufficiently removed, and the content thereof is preferably 0.1 weight % or less. Moreover, the average particle size is preferably in the range of 0.01 to 100 μm, and in the case of lithium hydroxide, the particle size is preferably in the range of 1 to 50 μm, and is more preferably in the range of 5 to 20 μm.

With respect to titanium dioxide ($TiO_2$), it should also have high purity. In particular, the purity is preferably 99.0 weight % or more, and is more preferably 99.5 weight % or more; the content of Fe, Al, Si, and Na included in fine particles of titanium dioxide as impurities is preferably less than 20 ppm respectively; and the content of Cl is preferably less than 200 ppm. More preferably, the content of Fe, Al, Si, and Na included in fine particles of titanium dioxide are less than 10 ppm, respectively; and the content of Cl is less than 100 ppm, and is more preferably less than 50 ppm. The average particle size is preferably in the range of 0.05 to 30 μm, and is more preferably in the range of 0.1 to 10 μm.

2. Preparation of Materials for Presintering

Lithium titanate and titanium dioxide as materials for presintering are sufficiently mixed, and are provided for presintering. The mixing ratio of the materials may be chosen to coincide with the desired value of the Li/Ti ratio of the lithium titanate in the desired final compound product. The term "Li/Ti ratio" refers to the atomic ratio unless otherwise specified. For example, when the Li/Ti ratio of the desired product is 0.78 or 0.80, the materials are mixed in a proportion of 0.78 or 0.80. In this case, a crushing mixer such as a vibrating mill or a ball mill, a mixer with an agitator, a rotating mixer, or the like is used. The moisture absorption during mixing should be monitored. The mixing is preferably performed in dry air with an absolute humidity of 5 g/m$^3$ or less in air; alternatively, it may be performed in an inert gas. The mixture of the raw materials is provided to a presintering process in bulk or as a green compact which is formed by compression at a pressure of 0.5 ton/cm$^2$.

3. Presintering Process

In the invention, first, the mixture of raw materials is presintered under the conditions indicated below. That is, the mixture of the raw materials is heated and sintered in an oxidizing atmosphere at a temperature in the range of 600 to 800° C., preferably in the range of 670 to 800° C., and more preferably in the range of 700 to 780° C. The duration of the heating and presintering is adequate at 30 minutes to 4 hours. The rate at which the temperature is increased is adequate in the range of 0.5 to 10° C./min. By this presintering process, a presintered product (hereinafter referred to as the "intermediate product") is obtained.

The chemical composition of the intermediate product is two components substantially consisting of $TiO_2$ and $Li_2TiO_3$, or three components substantially consisting of $TiO_2$, $Li_2TiO_3$, and $Li_4Ti_5O_{12}$. The chemical composition of the intermediate product may be specified by a chart obtained by an X-ray grain diffraction analysis. In the chart, $Li_2TiO_3$ is specified at 43.40, $Li_4Ti_5O_{12}$ is specified at 18° and 43°, and $TiO_2$ (rutile type) is specified at 27°, and the presence of these is determined. Also the presence of the raw material, for example, $Li_2CO_3$, is determined according to detection of a peak at 31.5°. Thus, in the invention, the presence of the intermediate products and the raw materials is determined by whether or not these compounds are detected by the X-ray grain diffraction analysis. Therefore, the invention does not exclude cases in which components other than the above components are not detected by the X-ray grain diffraction analysis. In cases in which the relative intensity of the peak is less than 1 when the peak exhibiting the maximum intensity among plural detected peaks is defined as 100, it is determined that the component is not detected by the X-ray grain diffraction analysis.

According to the basic concept of the invention, it is important that the lithium compounds in the raw material be entirely converted to intermediate products after the presintering process and that a part of $TiO_2$ as a raw material remain.

4. Sintering Process

In the invention, the intermediate product produced by the presintering process is subjected to a sintering process. In the sintering process, the intermediate product is heated to a temperature in the range of 800 to 950° C., and preferably to a temperature in the range of 820 to 950° C., more preferably to a temperature in the range of 850 to 930° C. without removing the intermediate product from the furnace. Alternatively, the compact is removed from the furnace, and is crushed and mixed to again form a compact, and is then heated to a temperature for the sintering process. When the temperature for the sintering process is less than 800° C., $TiO_2$ does not sufficiently react, and tends to remain in the final desired product, lithium titanate (such as $Li_4Ti_2O_5$). When the temperature for the sintering process exceeds 950° C., the chemical composition of $Li_4Ti_5O_{12}$ is converted into other compounds, and therefore it is difficult to obtain the desired Li/Ti ratio of 0.78 to 0.82. The temperature for the sintering process is set to be a temperature higher than that of the presintering process.

The sintering process can be performed in an oxidizing atmosphere, and the sintering duration may be set in the range of 30 minutes to 10 hours. The temperature and the duration for the sintering process is preferably chosen based on the subsequent residual amount of $TiO_2$. That is, the sintering process is performed so that the proportion of the intensity at the X-ray grain diffraction peak (27°) of $TiO_2$ in the product after the sintering process with respect to the intensity at the X-ray grain diffraction peak (18°) of $Li_4Ti_5O_{12}$, which is a relative intensity ratio (referred to as the "$TiO_2$ residual degree") and is 0.1 or less, preferably 0.05 or less, and more preferably 0.02 or less. The lithium titanate with such properties exhibit desirable battery properties when used in, for example, secondary lithium batteries.

The thus-obtained lithium titanate is removed from the sintering furnace and is subjected to suitable processes such as crushing, classification, and screening in a dry atmosphere, and the desired lithium titanate compound is thereby produced. The average particle size of lithium titanate is in the range of 0.1 to 15 µm, preferably in the range of 0.3 to 10 µm, and is more preferably in the range of 0.5 to 5 µm.

As explained above, the invention is characterized in that the raw material, lithium compounds, and titanium dioxide, are selectively converted to the specific compositions in the presintering process, and lithium titanate having a Li/Ti ratio (atomic ratio) in the range of 0.78 to 0.82 is produced in the subsequent sintering process. The conventional processes require larger amounts of raw material in consideration of vaporization losses of the lithium components in the sintering process, so that the Li/Ti ratio is not easily controlled and is not uniform. In contrast, the invention can solve these problems.

Preferred embodiments of the invention are described bellow.

(1) The combination of the temperatures for the presintering process in the range of 650 to 800° C. and for the sintering process in the range of 800 to 950° C. is employed.

(2) The combination of the temperatures for the presintering process in the range of 670 to 780° C. and for the sintering process in the range of 820 to 900° C. is employed.

(3) The presintering process produces two components substantially consisting of $Li_2TiO_3$ and $TiO_2$, or three components substantially consisting of $Li_2TiO_3$, $Li_4Ti_5O_{12}$ and $TiO_2$.

(4) The $TiO_2$ residual degree is 0.1 or less.

The invention also provides a negative electrode produced from the above lithium titanate for lithium ion battery. The electrode for the lithium titanate ion battery is produced by optionally adding electrode combination agents such as conductive agents and binders to the lithium titanate of the invention. In particular, it is possible to use conductive materials such as graphite, carbon black, acetylene black, Ketjen Black, carbon fiber, metallic powders such as those of copper, nickel, aluminum, silver, metal fiber, or polyphenylene derivatives. It is possible to use polysaccharides, thermoplastic resins, and elastic polymers, etc., as binders. Specifically, starch, polyvinyl alcohol, reconstituted cellulose, polyvinyl chlorides, polyfluorinated vinylidene, polyethylene, polypropylene, ethylene-propylene rubber, etc., can be used. A filler such as polypropylene or polyethylene can be added in addition to the above.

In addition, the invention provides a lithium ion battery using a negative electrode comprising the above lithium titanate. The lithium ion battery is composed of the negative electrode, a positive electrode, and electrolyte. Materials for the positive electrode are not limited, and well known materials can be used therein. For example, it is possible to use lithium manganate, lithium cobaltate, lithium nickelate, nickel inclusion lithium cobaltate, vanadium pentoxides, etc. The electrolyte used therefore is composed of a lithium salt and a solvent. Solvents such as propylene carbonate, ethylene carbonate, butylene carbonate, dimethyl carbonate, diethyl carbonate, γ-butyrolactone, methyl formate, methyl acetate, 1,2-dimethoxyethane, tetrahydrofuran, 2-methyltetrahydrofuran, dimethylsulfoxide, 1,3-dioxolane, formamide, dimethylformamide, dioxolane, acetonitrile, nitromethane, and ethylmonoglyme can be used as solvents. It is possible to use $LiPF_6$, $LiClO_4$, $LiCF_3SO_3$, $LiN(CF_3SO_2)_2$, and $LiBF_4$, etc. as the lithium salt. The lithium salt is dissolved in the solvent to form a electrolyte, and the lithium ion battery of the invention is constructed by combining the positive electrode and the negative electrode therein.

As mentioned above, the invention can efficiently provide lithium titanate having the desired composition by the specified production conditions, and therefore can provide a negative electrode and lithium ion battery exhibiting high discharge capacity and superior charging and discharging properties by using the lithium titanate in the negative electrode in a lithium ion battery.

The above are preferred embodiments. Other embodiments will be clear from further reading of specification.

EXAMPLES

The invention is explained more detailedly with reference to the examples hereinafter.

the mixture of the powders and was charged into a titanium die with a diameter of 50 mm and was then compressed into a plurality of green compacts at a pressure of 0.5 ton/cm². Then, the green compacts were inserted into an aluminum reaction tube with a diameter of 10.5 cm and a length of 100 cm. The aluminum reaction tube was inserted into a heating furnace and the temperature therein was increased at a rate of 4° C./min, whereby a presintering process in which the temperature was maintained at 700° C. for 4.5 hours was performed. During this process, oxygen was supplied into the heating furnace at a flow rate in the range of 0.08 to 0.1 Nl/min.

The compacts, which were intermediate products produced in the presintering process, were removed from the heating furnace and were crushed into particles with particle sizes in the range of 4 to 12 μm in the glove box filled with air using an agate mortar. The Li/Ti ratio was obtained by X-ray grain diffraction measurement and chemical analysis. The results are shown in Table 1. It should be noted that the "peak position" in Table 1 refers to the first peak position (angle) of each compound in the X-ray grain diffraction chart. With respect to the values in the table, the strongest peak among the X-ray grain diffraction peaks of the compounds is defined as 100, and the values of the other peaks indicate the relative intensities with respect to the strongest peak. The relative intensities were calculated from the height of each peak. Peaks with a relative intensity of less than 1 were deemed to be not detected.

TABLE 1

| | Presintering | | Results of X-Ray Diffraction Analysis after Presintering (Peak Position and Corresponding Compounds at the Peak Position) | | | | |
|---|---|---|---|---|---|---|---|
| Sample No. | Temperature (° C.) | Li/Ti Ratio | 18° ($Li_4Ti_5O_{12}$) | 27° ($TiO_2$) | 31.5° ($Li_2CO_3$) | 34° ($Li_4Ti_5O_{12}$) | 43.4° ($Li_2TiO_3$) |
| 1 | 700 | 0.773 | 39 | 100 | 0 | 0 | 22 |
| 2 | 700 | " | " | " | " | " | " |
| 3 | 700 | " | " | " | " | " | " |
| 4 | 700 | " | " | " | " | " | " |
| 5 | 750 | 0.787 | 86 | 100 | 0 | 26 | 24 |
| 6 | 750 | " | " | " | " | " | " |
| 7 | 750 | " | " | " | " | " | " |
| 8 | 750 | " | " | " | " | " | " |
| 9 | 800 | 0.690 | 100 | 5 | 0 | 56 | 1 |
| 10 | 800 | " | " | " | " | " | " |
| 11 | 800 | " | " | " | " | " | " |
| 12 | 800 | " | " | " | " | " | " |
| 13 | 750 | 0.787 | 86 | 100 | 0 | 26 | 24 |
| 14 | 750 | " | " | " | " | " | " |
| 15 | 650 | 0.785 | 31 | 100 | 12 | 0 | 15 |
| 16 | 650 | " | " | " | " | " | " |
| 17 | 650 | " | " | " | " | " | " |
| 18 | 650 | " | " | " | " | " | " |

Sample No. 1

291.25 g of a titanium dioxide powder with a purity of 99.9% (produced by TOHO TITANIUM Co., Ltd., 90% of rutile rate) and 108.75 g of lithium carbonate with a purity of 99.0% (produced by WAKO JUNYAKU Co., Ltd.) were weighed in a glove box filled with atmosphere, and thus a raw material with a Li/Ti ratio of 0.80 was obtained. The average particle sizes of the powders were in the range of 0.1 to 10 μm.

Then, the titanium dioxide powder and the lithium carbonate powder were charged into a rocking mixer and were mixed for 2 hours therein. A 100 g portion was taken from A 100 g portion was taken from the crushed powder and was charged into a titanium die with a diameter of 50 mm, and was then compressed into a plurality of green compacts at a pressure of 0.5 ton/cm². The green compacts were then inserted into an aluminum reaction tube, and the aluminum reaction tube was inserted into a heating furnace, whereby a sintering process in which the temperature was maintained at 800° C. for 4.5 hours was performed. During this process, oxygen was supplied into the heating furnace at a flow rate in the range of 0.08 to 0.1 Nl/min. The compacts, which were produced in the sintering process, were crushed into a lithium titanate powder in a glove box filled with air using an agate mortar. The Li/Ti ratio was obtained through chemical analysis. The Li/Ti ratios in the temperatures for the presintering process and the sintering process are shown in Table 2. An X-ray grain diffraction measurement was performed on the final product lithium titanate powder, and the $TiO_2$ residual degree was obtained based on the percentage, $I(TiO_2)/I(Li_4Ti_5O_5)$, of the peak intensity of the rutile type $TiO_2$ at 27°, with respect to the peak intensity of the $Li_4Ti_5O_5$ at 18°. The results are shown in Table 2. Table 2 shows that the amount of the residual $TiO_2$ is small as the percentage is small, and highly pure lithium titanate was produced.

TABLE 2

| Sample No. | Presintering Temperature (° C.) | Sintering Temperature (° C.) | Li/Ti Ratio | $TiO_2$ Residual Degree |
|---|---|---|---|---|
| 1 | 700 | 800 | 0.798 | 0.06 |
| 2 | 700 | 850 | 0.792 | 0.01 |
| 3 | 700 | 900 | 0.789 | 0.01 |
| 4 | 700 | 950 | 0.790 | 0.01 |
| 5 | 750 | 800 | 0.793 | 0.04 |
| 6 | 750 | 850 | 0.790 | 0.02 |
| 7 | 750 | 900 | 0.790 | 0.01 |
| 8 | 750 | 950 | 0.793 | 0.02 |
| 9 | 800 | 800 | 0.777 | 0.01 |
| 10 | 800 | 850 | 0.778 | 0.01 |
| 11 | 800 | 900 | 0.822 | 0 |
| 12 | 800 | 950 | 0.800 | 0.01 |
| 13 | 750 | 850 | 0.789 | 0.01 |
| 14 | 750 | 900 | 0.793 | 0.01 |
| 15 | 650 | 800 | 0.706 | 0.04 |
| 16 | 650 | 850 | 0.707 | 0.02 |
| 17 | 650 | 900 | 0.713 | 0.02 |
| 18 | 650 | 950 | 0.709 | 0.02 |
| 19 | none | 800 | 0.680 | 0.06 |

Samples Nos. 2 to 12

The same experimental procedure as that for Sample No. 1 was performed, except that the presintering process and the sintering process were performed at the temperatures shown in Table 1. The results are shown in Table 1 and 2.

Sample No. 13

291.25 g of titanium dioxide powder with a purity of 99.9% (produced by TOHO TITANIUM Co., Ltd., 90% of rutile rate) and 108.75 g of lithium carbonate with a purity of 99.0% (produced by WAKO JUNYAKU Co., Ltd.) were weighed in a glove box filled with air, and thus a raw material with a Li/Ti ratio of 0.80 was obtained. The average particle sizes of the powders were in the range of 0.1 to 10 μm.

The titanium dioxide powder and the lithium carbonate powder which were weighed were then charged into a rocking mixer and were mixed for 2 hours therein. A 100 g portion was taken from the mixture of the powders and was charged into a titanium die with a diameter of 50 mm and was then compressed into a plurality of green compacts at a pressure of 0.5 ton/cm². The green compacts were then inserted into an aluminum reaction tube with a diameter of 10.5 cm and a length of 100 cm. The aluminum reaction tube was inserted into a heating furnace, whereby a presintering process in which the temperature was maintained at 750° C. for 4.5 hours was performed. Subsequently, the temperature in the furnace was increased, whereby a sintering process in which the temperature was maintained at 850° C. for 10.5 hours was performed. During this process, oxygen was supplied into the heating furnace at a flow rate in the range of 0.08 to 0.1 Nl/min. The compacts produced in the sintering process were crushed into a lithium titanate powder in the glove box filled with air using an agate mortar, thereby yielding a lithium titanate powder. The chemical compositions after the presintering process are shown in Table 1, and the Li/Ti ratio and $TiO_2$ residual degree are shown in Table 2.

Sample No. 14

The same experimental procedure as that for Sample No. 13 was performed, except that the sintering process was performed at a temperature of 900° C. for 4.5 hours. The results are shown in Tables 1 and 2.

Samples Nos. 15 to 18

The same experimental procedure as Sample No. 1 were performed, except that the presintering process and the sintering process was performed at the temperatures shown in Table 1. The results are shown in Tables 1 and 2.

Sample No. 19

291.25 g of titanium dioxide powder with a purity of 99.9% (produced by TOHO TITANIUM Co., Ltd., 90% of rutile rate) and 108.75 g of lithium carbonate with a purity of 99.0% (produced by WAKO JUNYAKU Co., Ltd.) were weighed in a glove box filled with air, and thus a raw material with a Li/Ti ratio of 0.80 was obtained. The average particle sizes of the powders were in the range of 0.1 to 10 μm.

The titanium dioxide powder and the lithium carbonate powder which were weighed were then charged into a rocking mixer and mixed for 2 hours therein. A 100 g portion was taken from the mixture of the powders and was charged into a titanium die with a diameter of 50 mm, and was then compressed into a plurality of green compacts at a pressure of 0.5 ton/cm². The green compacts were then inserted into an aluminum reaction tube with a diameter of 10.5 cm and a length of 100 cm. The aluminum reaction tube was inserted into a heating furnace, and the temperature in the furnace was increased at a rate of 4° C./min, whereby a sintering process in which the temperature was maintained at 800° C. for 4.5 hours was performed, without the presintering process. During this process, oxygen was supplied into the heating furnace at a flow rate in the range of 0.08 to 0.1 Nl/min. The compacts produced in the sintering process were crushed into a lithium titanate powder in a glove box filled with air using an agate mortar, thereby yielding a lithium titanate powder. The Li/Ti ratio and $TiO_2$ residual degree are shown in Table 2.

As is clearly shown in Tables 1 and 2, in Samples Nos. 1 to 14 in which the composition consisting of $TiO_2$ and $Li_2TiO_3$ or the composition consisting of $TiO_2$, $Li_2TiO_3$ and $Li_4Ti_5O_{12}$ were produced in the intermediate products after the presintering process, the Li/Ti ratios of the final products, lithium titanate ($Li_4Ti_5O_{12}$), are approximately 0.80, which is the theoretical value, and products having chemical compositions controlled to within the desired value were produced. In contrast, $Li_2CO_3$ as a raw material remained in the intermediate products after the presintering process in Samples Nos. 15 to 18, and no presintering process was performed in Sample No. 19. Therefore, the Li/Ti ratios of the final products of lithium titanate ($Li_4Ti_5O_{12}$) in the samples were approximately 7.0, and the amounts of the lithium components were very low since the lithium component was lost by vaporization, and therefore lithium titanate with a desired composition could not be produced.

As described above, according to the process for producing lithium titanate of the invention, a mixture of titanium dioxide and lithium compounds are presintered to yield a composition consisting of $TiO_2$ and $Li_2TiO_3$ or a composition consisting of $TiO_2$, $Li_2TiO_3$ and $Li_4Ti_5O_{12}$, the composition is then sintered, and vaporization loss of the lithium component can be suppressed, the desired Li/Ti ratio can be obtained, and therefore lithium titanate with superior properties for, for example, secondary lithium batteries, can be produced.

What is claimed is:

1. A process for producing lithium titanate, comprising presintering a mixture of titanium dioxide and at least one lithium compound selected from the group consisting of lithium carbonate, lithium hydroxide, lithium nitrate, and lithium oxide for a duration of 30 minutes to 4 hours at a temperature of at least 600° C. and less than 800° C., to yield at least one of a composition comprising $TiO_2$ and $Li_2TiO_3$ and a composition comprising $TiO_2$, $Li_2TiO_3$ and $Li_4Ti_5O_{12}$, and separately sintering the composition at a temperature of from 800° C. to 950° C.

2. A process for producing lithium titanate according to claim 1, wherein the presintering is performed at a temperature of not less than 670° C. and of less than 800° C., and the sintering is performed at a temperature in the range of 800° C. to 950° C.

3. A process for producing lithium titanate according to claim 1, wherein a powder of the lithium compound and a powder of the titanium dioxide are mixed and compacted into a green compact, the green compact is presintered, the presintered compact is ground to obtain pieces, and the pieces of the presintered compact are re-compacted, and sintered.

4. A process for producing lithium titanate according to claim 1, wherein a powder of the lithium compound and a powder of the titanium dioxide are mixed and compacted into a green compact, the resulting green compact is presintered at a first temperature, the temperature is increased, and the green compact is sintered after the temperature is increased.

5. A negative electrode for a lithium ion battery comprising lithium titanate according to claim 1.

6. A lithium ion battery having a negative electrode or a positive electrode comprising the lithium titanate according to claim 1.

* * * * *